United States Patent [19]

Birrenbach

[11] Patent Number: 5,802,098
[45] Date of Patent: Sep. 1, 1998

[54] MELTING VESSEL WITH FASTENING, MOUNTING AND TILTING DEVICES

[75] Inventor: Alfons Birrenbach, Oberhausen, Germany

[73] Assignee: MAN Gutehoffnungshütte Aktiengesellschaft, Oberhausen, Germany

[21] Appl. No.: 616,435

[22] Filed: Mar. 15, 1996

[30] Foreign Application Priority Data

Mar. 15, 1995 [DE] Germany ............... 195 09 285.6

[51] Int. Cl.⁶ .................................................. F27D 23/00
[52] U.S. Cl. .......................... 373/78; 373/20; 373/72; 266/143; 75/10.19
[58] Field of Search .......................... 373/2, 8, 9, 20, 373/18, 30, 33, 43, 44, 45, 66, 68, 72, 78, 79, 84; 75/10.19; 266/143, 901

[56] References Cited

U.S. PATENT DOCUMENTS

| 1,102,382 | 7/1914 | Benjamin | 373/78 |
| 1,335,009 | 3/1920 | Moore | 373/78 |
| 3,746,325 | 7/1973 | Freeberg et al. | 266/13 |
| 4,606,760 | 8/1986 | Fritz et al. | 75/10.19 |
| 4,758,268 | 7/1988 | Bishop et al. | 75/25 |
| 5,235,611 | 8/1993 | Jones et al. | 373/20 |
| 5,421,850 | 6/1995 | Dube et al. | 75/10.19 |

FOREIGN PATENT DOCUMENTS

| 0483322B1 | 5/1991 | Germany . |
| 4302285 C2 | 1/1993 | Germany . |
| 4445209 | 6/1996 | Germany . |

Primary Examiner—Tu B. Hoang
Attorney, Agent, or Firm—McGlew And Tuttle

[57] ABSTRACT

A melting vessel plant, in which the melting vessel is a converter vessel, to which a vessel cover with a pipe connection for removing the flue gases is attached. Either an oxygen lance with an auxiliary cover or electrodes with an auxiliary cover are introduced into the melting vessel through the vessel cover. The spherical melting vessel is lined with a lining. It is arranged on running rails as a traveling melting vessel, and it is mounted on an inner running rim and an outer running rim. The melting vessel is fastened to the inner running rim by support elements arranged on the circumference. Both running rims are interlocked by shear wedges. With the melting vessel locked, a cable winch with traction cables makes possible the tilting movements of the melting vessel both in the direction of steel tapping on the running rails and back into the upright position.

12 Claims, 6 Drawing Sheets

MELTING VESSEL WITH FASTENING, MOUNTING AND TILTING DEVICES

FIELD OF THE INVENTION

The present invention pertains to a melting vessel plant with fastening, mounting and tilting devices, wherein the melting vessel is a converter vessel, with a vessel diameter that corresponds to only 0.6–0.7 times the diameter of an arc furnace and is operated as a basic top-blown oxygen converter or as an arc furnace.

BACKGROUND OF THE INVENTION

A number of devices have been known for steel-making, which process mainly hot, molten pig iron in combination with scrap iron, ore, metallized iron ore and other metallic charges in the conventional way (blast furnace-converter), using melting vessels, e.g., electric arc furnaces, in which predominantly cold or preheated charges, such as scrap iron and metallized iron ore are used.

Top-blown converters and electric arc furnaces are used and operated predominantly as individual units, and one converter is usually lined or is left as a reserve in steel mills having two or three converter plants.

Tandem or double furnace plants, especially ones consisting of electric arc furnaces, have been developed in recent years, which served the purpose of low-cost and environmentally friendly steel-making because of the increasing short supply of resources in terms of energy and charges.

These include the prior-art measures of using hot flue gases drawn off from the electric furnace during the operation of electric arc furnaces to preheat the charge, usually scrap iron.

A melting unit with two melting vessels arranged next to each other has been known from EP 0 483 322; this melting unit has a heating unit for supplying energy for melting and is equipped with two melting furnaces arranged next to each other. The hot waste gases of one melting furnace, which are generated during the melting process, are introduced into the corresponding other melting furnace via waste gas lines to preheat metallic charge, and wherein a shaft, in which the charge is preheated, is arranged at each melting furnace on one side.

A process and a device for operating a two-furnace plant have been known from DE 43 02 285.

In this steel mill with a double furnace, one of the two furnaces is supplied with electricity to melt down the scrap iron contained in it, while the other furnace is disconnected from the power supply. The furnace disconnected from the power supply is filled with charge and then closed with a cover.

Via a connection line provided between the two furnaces, the flue gas is sent from the furnace that is in operation into the furnace that is disconnected from the power supply.

A double-vessel arc furnace plant, in which molten pig iron is processed in the arc furnace together with metallized iron ore, is described in DE 4,445,209.

It is possible to process up to 70% of molten pig iron in this double-furnace plant, because refining is first performed with oxygen via a blast lance in the furnace vessel, into which the high percentage of pig iron is first charged, while adding cold metallized iron ore and lime at the same time.

After producing a premelt, the blast lance is pivoted off, and the steel-making is continued after pivoting in the electrodes as an arc furnace process, with continuing addition of metallized iron ore, lime and other metallic charges, until the required quantity and quality of steel is obtained. Both furnace vessels are equipped as arc furnace vessels with vessel covers that can be pivoted off.

The drawback of these prior-art double-furnace plants is the high space requirement for the arc furnaces, associated with a high cost of construction, especially for the tilting drive and the furnace foundations, as well as a low bath height in the melting vessels, which permit only slow blowing with oxygen compared with a prior-art converter vessel.

SUMMARY AND OBJECTS OF THE INVENTION

The object of the present invention is therefore to provide a melting vessel apparatus which is designed as a single or double plant, in which the mounting and tilting device for the melting vessel is considerably simplified, in which a high melt bath can be reached, in which the rate of oxygen blowing is increased, and in which the final temperature and the qualitative composition of the melt which are necessary for direct pouring are reached without additional secondary metallurgical aftertreatment, e.g., in an electrically heated pan furnace.

The melting vessel according to the present invention is preferably designed as a converter vessel and has a diameter that is only 0.6–0.7 times the diameter of an arc furnace and is operated as a basic top-blown oxygen converter via a blast lance and as an arc furnace by means of electrodes.

The height of the melt within the lining corresponds, after a fresh lining, to 1.5–1.8 times the height of the melt bath of an arc furnace.

The melting vessel is preferably designed as a spherical melting vessel, which is mounted movably, rotatably and tiltably in an inner running rim and an outer running rim, is integrated within the steel structure of a steel mill building and for which no vessel-specific foundation units are necessary. The roller paths for the running rims may also be designed as track systems with their own strip foundation.

The melting vessel with the inner and outer running rims is mounted rotatably on two running rails each, which are arranged in a working platform. The suspension of the melting vessel in the inner running rim is designed such that the center of gravity is located under the center of the double rim. The vessel can stand up by itself after steel or slag tapping.

The melting vessel is moved on the running rails by a double cable, which is wound around a winch unit with the outer running rim, wherein the traction cables are guided in grooves of the outer running rim.

A two-sided cable winch is arranged on one side of the melting vessels in the area of the running rails, and corresponding deflection rollers provided with tensioning means are arranged on the opposite side. The melting vessel can be brought into any working position by the cable drive; it can be brought into the charging and steel-tapping position, into the slag-tapping position during the emptying of the residual slag, and it can also be turned upside down for clearing and lining operations.

A second groove, which extends over the head of the running rail, is provided in the outer running rim. The connection between the running rim groove and the rail head is necessary in order to avoid skewing of the melting vessel during the tilting or draining process.

Rim locking means locks the inner and outer rims together. When the rims are locked together and the cable rotates the outer rim, the inner rim and the melting vessel rotate also. This allows the melting vessel to be tipped for unloading and other functions. When the rim locking means unlocks the two rims, rotation of the outer rim laterally moves the melting vessel while maintaining the melting vessel upright.

The melting vessel is covered with a vessel cover with a cooled fume hood placed on it. The cover is lifted off and put on by means of a lifting gear.

The middle part of the water-cooled fume hood is closed, depending on the mode of operation, with an auxiliary cover for the electrodes or for a blast lance.

Only one electrode device or lance unit is provided in the case of melting vessels arranged next to each other.

The electrode device is rotated into the working or parking position by a rotating platform. The column guide is arranged under a rotating platform, and the electrode, lifting and lowering device is arranged on a rotating platform.

The blast lance is clamped on a lance carriage guided around a column with a rigid boom. The lifting and lowering device is moved by an endless cable line clamped in a winch. The blast lance is designed as a multiple-nozzle lance with water cooling. The auxiliary covers are raised or lowered by a boom lifting truck guided around an electrode or lance column.

The melting vessel plant can be operated with one and two melting vessels alike.

The plant is designed such that it is possible to work with a blast lance or with electrodes. However, corresponding to the process from the yet unpublished P 44 45 209.8, it is possible to use here up to 85% of molten pig iron or more if the necessary cooling agents, metallized iron ore, scrap iron, ore, and other metallic charges are added.

When this process is used, oxygen is fed in with a blast lance in the first process step, the electrodes are used in the second process step, and additional metallic charges and additives are added to reach the necessary final temperature of the melt for direct pouring, e.g., in a continuous casting plant. The use of an additional, electrically heated pan furnace for the further secondary metallurgical processing and for reaching or maintaining the necessary pouring temperature can be abandoned here.

Molten metallic charges are added before the beginning of oxygen blowing. Solid metallic charges are added via slides or chutes through the mouth of the melting vessel before or during the oxygen blowing or during the work with the electrodes.

The additives for the metallurgical process and for slag formation are added in the known manner in the form of lumps or a dust.

The melting vessels are lined with refractory material, an outer lining and wear layer. Additional openings for tapping steel and slag may be provided laterally in the wall of the melting vessel, and the bottom may be designed as a closed or removable bottom.

The melting vessels may be retrofitted in the known manner such that circulation gases can be blown at any time into the melt directly through the bottom or laterally above the bottom.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
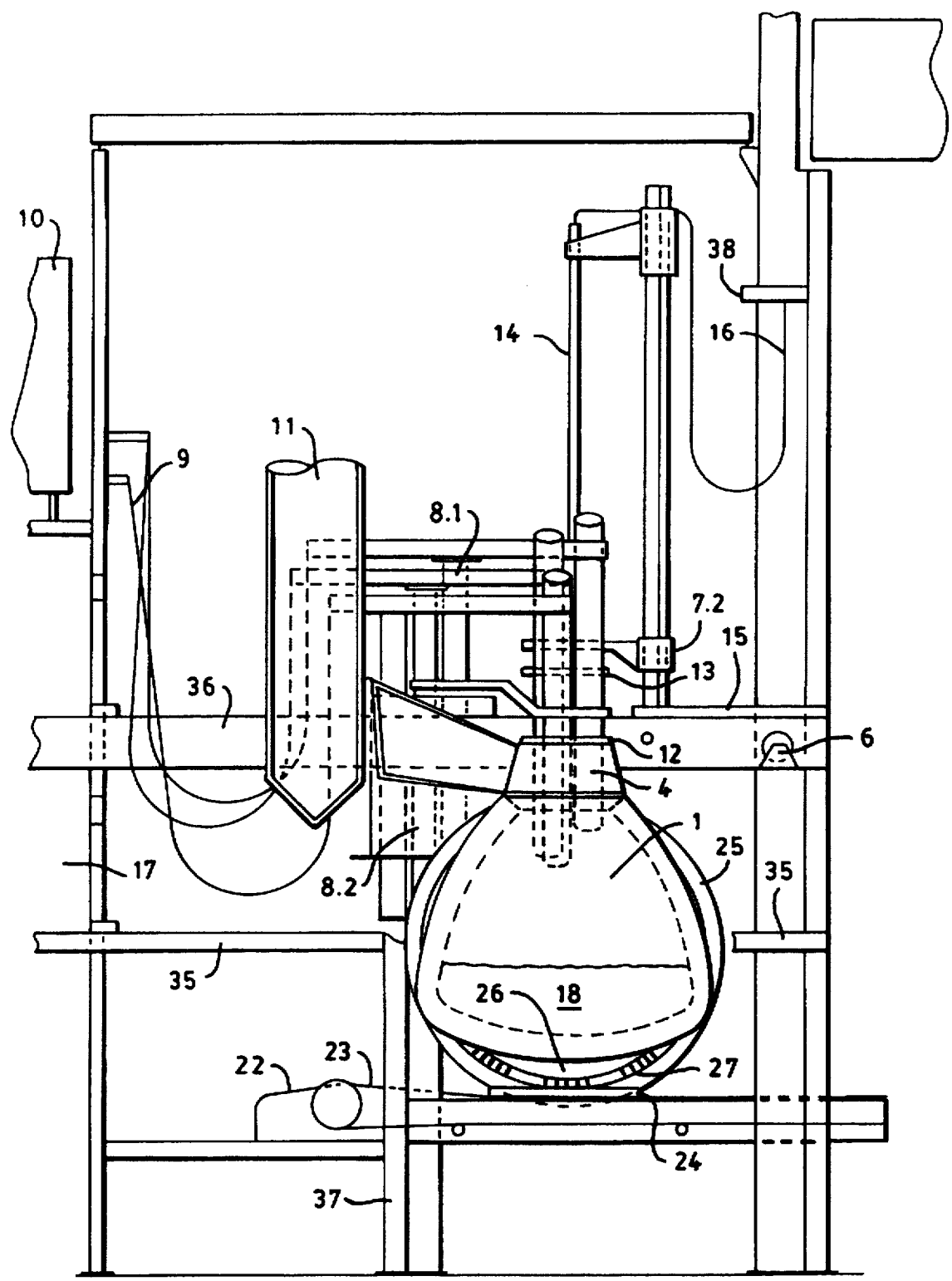
FIG. 1 is a section through the melting vessel plant arranged in a support structure.

Referring to the drawings, FIG. 1 is a section through the melting vessel 1, which is arranged tiltably in a support structure or framework 37 between working platforms 35, 36 and on the running rail 29. The melting vessel 1 is mounted in an inner running rim 26 and an outer running rim 25.

A cable winch 22 with traction cables 23 makes possible tilting movements of the melting vessel 1 with a melt 18 in the direction of the steel tapping or slag tapping.

Separate foundations arranged in pairs for the melting vessel 1 or for the melting vessels are not necessary, because the loads are directly transmitted via the running rails 29 into the steel structure 37 and the support foundations.

A vessel cover 4 suspended on a cover lifting gear 6 with a cooled waste gas collection hood and with a pipe connection, which has a connection to the waste gas line 11, is arranged above the melting vessel 1.

The electrode holder means 8.2 is mounted on a rotating platform, which is supported on the cover platform 36, wherein the column guide is arranged under the platform 36, and the lifting and lowering drives are arranged on the platform 36. The electrode columns are passed through the platform 36. The electrode arms for the electrodes 3 are fastened to the columns. A current-conducting connection to the transformer 10 is created with high-current cables 9.

An oxygen lance 14 with medium feed means 16 is arranged on a lance platform 38 on a lance lifting and pivoting device or means 15. Craneway supports are arranged above the steel structure 37 for the shop crane, and a control stand 17 is arranged at the level of the working platform 35.

Figure 2:
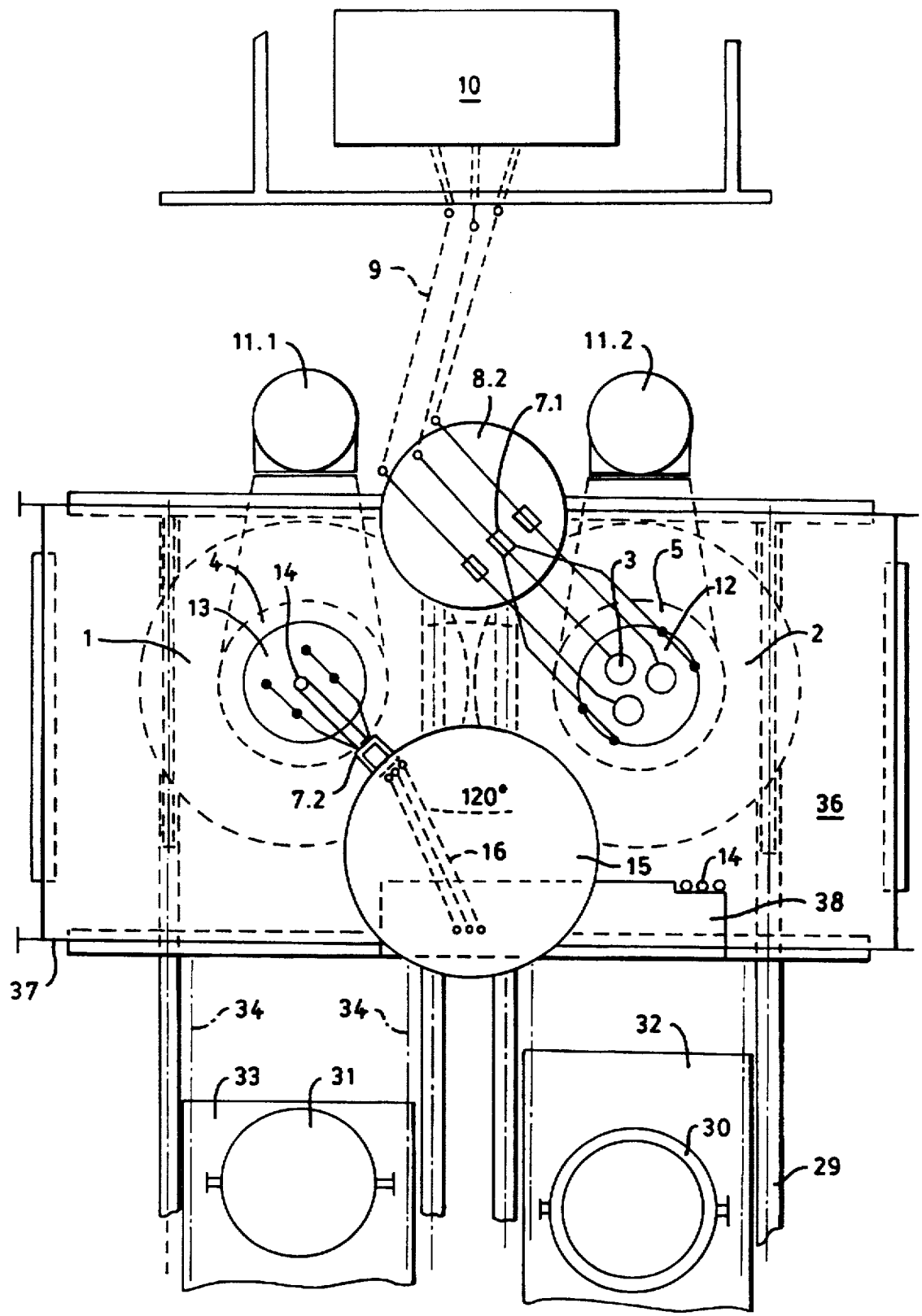
FIG. 2 is a top view of a double-vessel melting plant.

FIG. 2 shows an axis-parallel arrangement of two melting vessels 1, 2, in which a pivotable electrode holder 8.2 with stationary electrode holder 8.1 and, the power lead 9 from the transformer 10 for the electrodes 3 in the direction of the transformer case, and a lifting and pivoting device 15 for the blast lance 14 and for the auxiliary cover 13 are arranged axially in parallel between the melting vessels 1, 2 in the direction of the transfer cars 32, 33 holding steel casting ladle 30 and slag bucket 31 respectively. The transfer cars having rails 34. Melting vessel 2 is shown with vessel cover 5.

The lifting and pivoting device of the lance unit 15 is installed on the cover platform 36 and includes lifting gear 7.1. It comprises essentially the rotating platform with the guide column placed on it, the lance drive, as well as the lance carriage with boom and clamping device for the blast lance. An additional lifting gear 7.2 is provided for the auxiliary cover 13 on the lifting and pivoting device of the lance unit 15. Melting vessel 1 has waste gas line 11.1 and melting vessel 2 has waste gas line 11.2.

Figure 3:
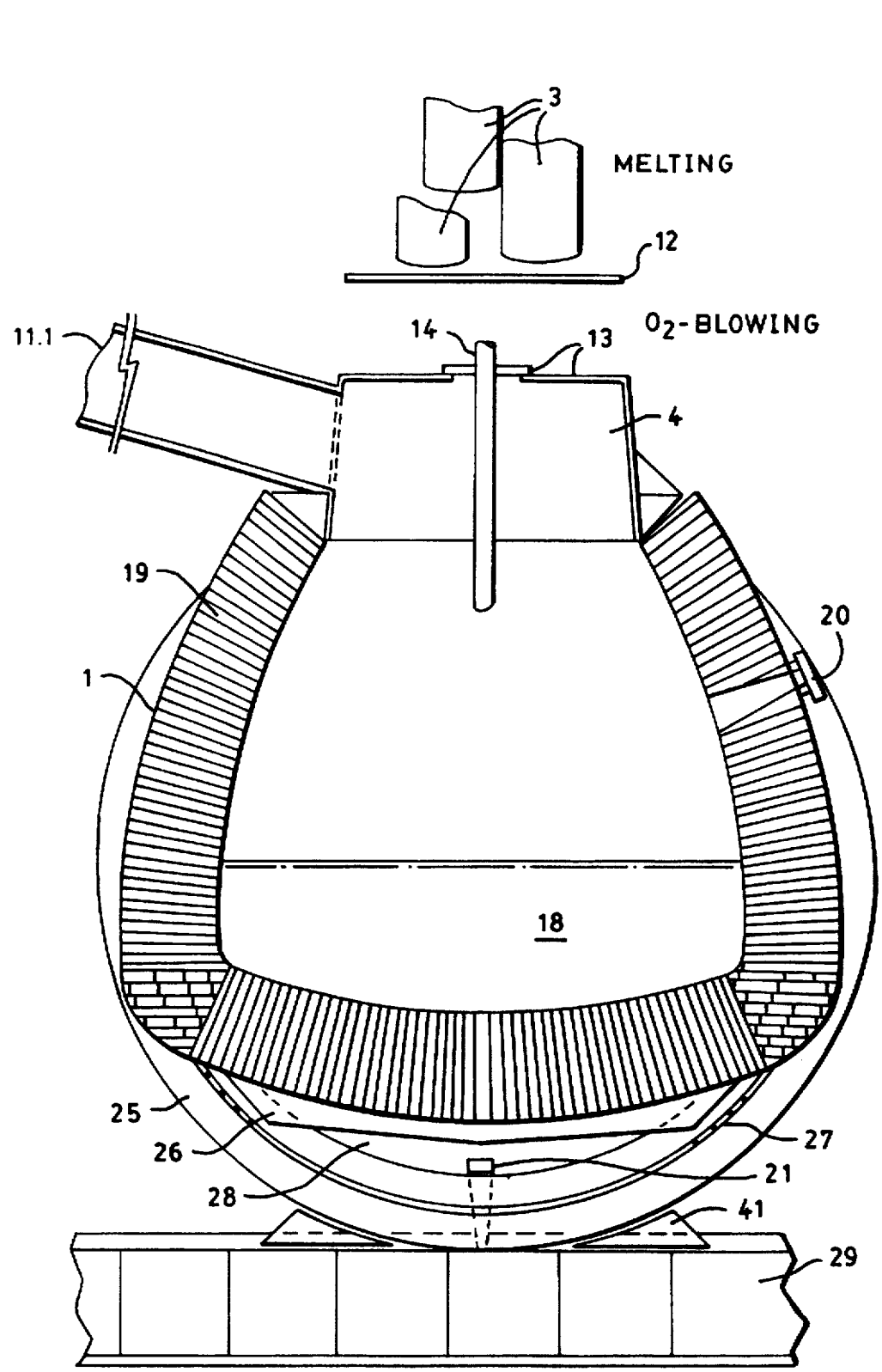
FIG. 3 is a section through a melting vessel.

FIG. 3 shows a section through the melting vessel 1 provided with a lining 19 with the vessel cover 4 put on, with the auxiliary cover 13 and with the blast lance 14 withdrawn. Instead of the blast lance 14 and the auxiliary cover 13, it is possible to mount electrodes 3 with an auxiliary cover 12 on the vessel cover 4. A tapping spout 20 is included with the melting vessel 1.

The melting vessel 1 is mounted in an inner rim 26 and is fastened to same by support elements 28 arranged on the circumference. The inner rim 26 slides in the outer rim 25 by means of roller segments 27. The two rims 25 and 26 are locked by a rim locking means including automatically actuated shear wedges 21. The melting vessel 1 is moved over the outer running rim 25 on the running rail 29 by means of a cable line. The outer running rim 25 is secured in the working position by a rail locking means 41.

Figure 4:
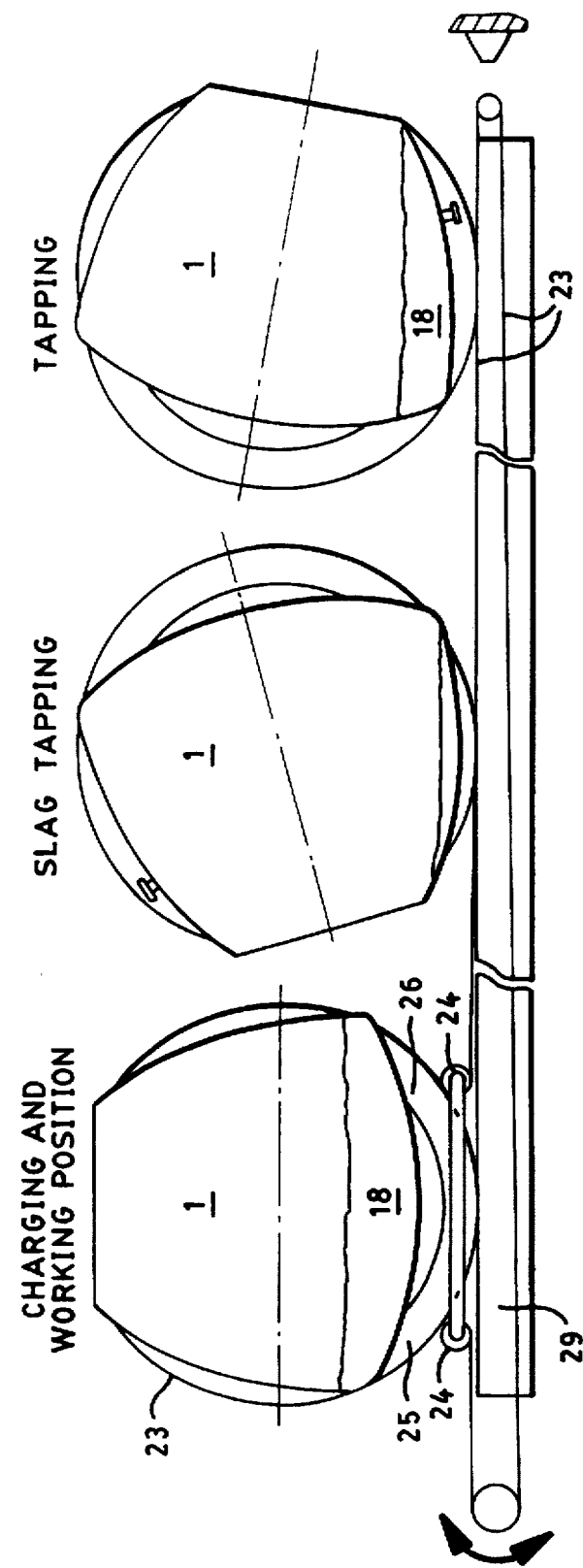
FIG. 4 is a section through a melting vessel in different operating positions with cable drive.
Figure 5:
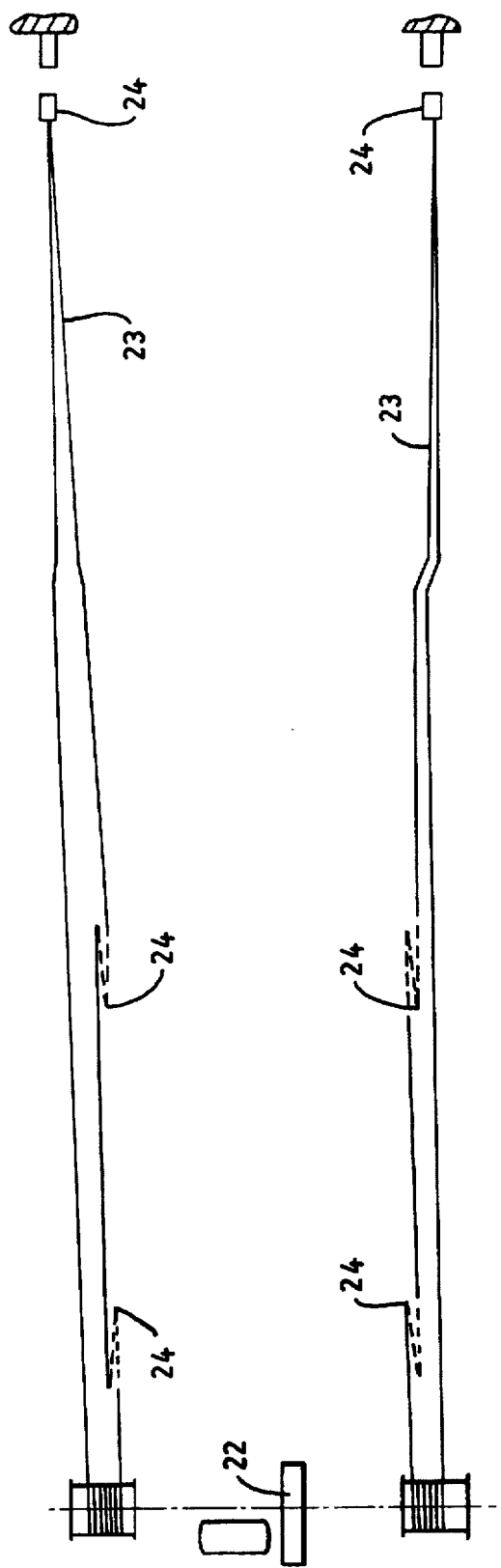
FIG. 5 is a top view of the cable drive.

The tilting movement and the displacement of the melting vessel 1 on the running rail 29 into the different positions charging, slag tapping, tapping, and then again the blasting or working position are performed, as is shown in FIGS. 4 and 5, by a cable winch 22 with two continuous traction cables 23, which are guided in a groove each around the outer ring 25 and via spring-loaded deflection rollers 24, which ensure the necessary tension of the traction cables 23.

Figure 6:
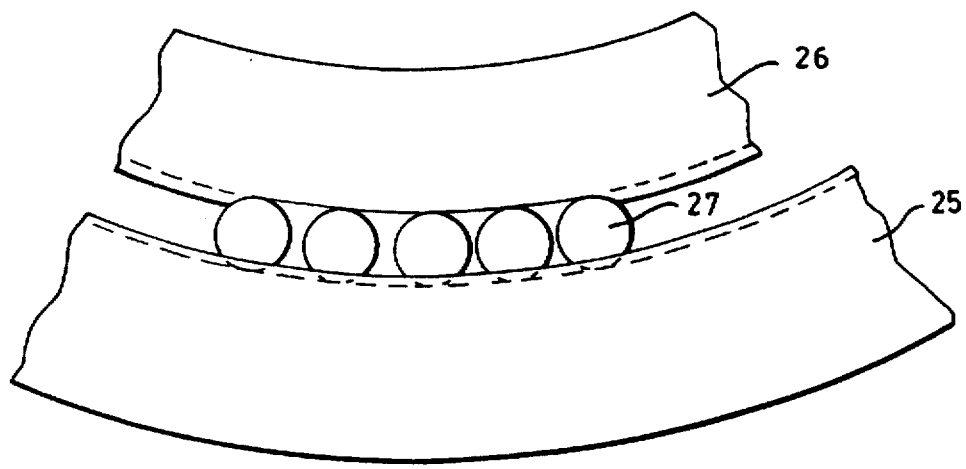
FIG. 6 is a side view of the running rims.

FIG. 6 shows a section of the inner running rim 26 and the outer running rim 25, which are mounted against each other in roller segments 27.

Figure 7:
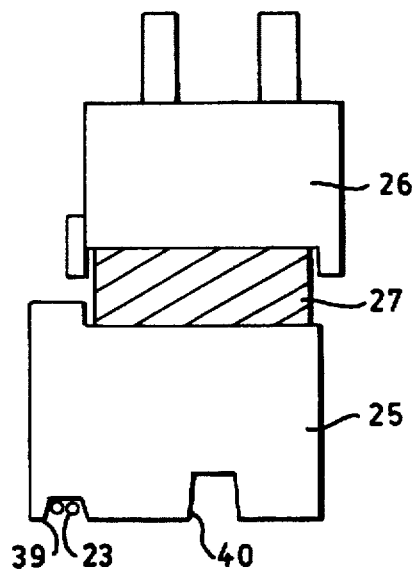
FIG. 7 is a section through the running rims.

A section according to FIG. 7 shows the inner running rim 26 and the outer running rim 25 as well as a track roller of the roller segments 27.

Figure 8:
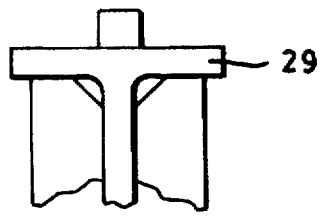
FIG. 8 is a section through the running rail.

A groove 39 for the traction cable 23 and a flange groove 40 for the running rail 29 shown in FIG. 8 are milled in the outer running rim 25.

The head of the running rail 29 is designed as a square longitudinal bar and is fastened to a double-T beam with corresponding bracing means.

While specific embodiments of the invention have been shown and described in detail to illustrate the application of the principles of the invention, it will be understood that the invention may be embodied otherwise without departing from such principles.

What is claimed is:

1. A melting apparatus comprising:

a framework;

a melting vessel positioned on said framework;

a running rail mounted on said framework;

an inner rim mounted on said melting vessel;

an outer rim rotatably mounted on said inner rim, said outer rim being rollable on said running rail;

cable means located on said framework and in contact with said outer rim, said cable means is for moving said melting vessel along said running rail;

rim locking means for locking said inner rim to said outer rim;

a blast lance positionable in said melting vessel;

lance lifting and pivoting means connected to said blast lance and said framework, said lance pivoting and lifting means moving said blast lance into and out of said melting vessel;

an electrode positionable in said melting vessel;

electrode holder means connected to said electrode and said framework, said electrode holder means moving said electrode into and out of said melting vessel.

2. An apparatus in accordance with claim 1, wherein:

said melting vessel is detachably fastened to said inner rim with support elements arranged on a circumference of said melting vessel;

said inner rim being movably mounted in a said outer rim by means of roller segments;

said rim locking means includes a shear wedge;

said outer rim defines a flange groove for rolling on said running rail, and said outer rim also defines a cable groove;

said cable means rolls said outer rim on said running rail, and includes a cable located in said cable groove, said cable means also includes a cable winch and deflection rollers.

3. An apparatus in accordance with claim 1, wherein:

a rail locking means fixes said melting vessel in a vertical position.

4. An apparatus in accordance with claim 1, wherein:

said lance lifting and pivoting means and said electrode holder means with a power lead for said electrode are arranged above said melting vessel.

5. An apparatus in accordance with claim 1, further comprising:

a vessel cover designed as a fume hood and positionable on said melting vessel;

cover lifting means for removing said vessel cover from said melting vessel.

6. An apparatus in accordance with claim 5, wherein:

a first auxiliary cover contains said blast lance;

first lifting means lowers said first auxiliary cover onto said vessel cover;

a second auxiliary cover contains said electrode;

second lifting means lowers said second auxiliary cover onto said vessel cover.

7. An apparatus in accordance with claim 1, wherein:

said blast lance is a multiple lance.

8. An apparatus in accordance with claim 6, wherein:

said vessel cover includes a waste gas pipe and waste lines;

said vessel cover with said waste gas pipe and said waste lines, said electrode holder means, said first and second auxiliary covers and said blast lance are water-cooled.

9. An apparatus in accordance with claim 1, wherein:

another said melting vessel similar to said melting vessel is arranged next to said melting vessel, said melting vessel and said another melting vessel having axes parallel to each other.

10. An apparatus in accordance with claim 9, wherein:

said electrode holder means includes power leads, said electrode holder means with said electrode and with said power leads is arranged on a pivoting platform and can be pivoted to said melting vessel and said another melting vessel.

11. An apparatus in accordance with claim 10, wherein:
another said melting vessel similar to said melting vessel is arranged next to said melting vessel, said melting vessel and said;
said lance lifting and pivoting device with said blast lance and with said first lifting means is arranged on said framework with an axis substantially parallel to said electrode holder means.

12. An apparatus in accordance with claim 1, wherein:
another of said inner and outer rims are positioned on said melting vessel and said framework; and
another said electrode is positionable in said melting vessel.

* * * * *